US012236353B2

(12) United States Patent
Zoldi et al.

(10) Patent No.: US 12,236,353 B2
(45) Date of Patent: Feb. 25, 2025

(54) LATENT-SPACE MISALIGNMENT MEASURE OF RESPONSIBLE AI FOR MACHINE LEARNING MODELS

(71) Applicant: FAIR ISAAC CORPORATION, Roseville, MN (US)

(72) Inventors: Scott M. Zoldi, San Diego, CA (US); Jeremy Schmitt, Encinitas, CA (US); Qing Liu, San Diego, CA (US)

(73) Assignee: FAIR ISAAC CORPORATION, Minneapolis, MN (US)

( * ) Notice: Subject to any disclaimer, the term of this patent is extended or adjusted under 35 U.S.C. 154(b) by 1021 days.

(21) Appl. No.: 17/121,594

(22) Filed: Dec. 14, 2020

(65) Prior Publication Data
US 2022/0188644 A1 Jun. 16, 2022

(51) Int. Cl.
*G06N 3/088* (2023.01)
*G06N 3/045* (2023.01)

(52) U.S. Cl.
CPC ............. *G06N 3/088* (2013.01); *G06N 3/045* (2023.01)

(58) Field of Classification Search
CPC ...... G06N 3/045; G06N 3/0455; G06N 3/084; G06N 3/088; G06N 20/20
USPC .......................................................... 706/25
See application file for complete search history.

(56) References Cited

U.S. PATENT DOCUMENTS

2020/0125982 A1    4/2020  Gabourie et al.
2020/0334538 A1 * 10/2020  Meng ..................... G10L 15/16

FOREIGN PATENT DOCUMENTS

WO    WO-2020056157 A1 *  3/2020  .......... B60L 15/2045

OTHER PUBLICATIONS

Lassance et al., 2019. "Deep Geometric Knowledge Distillation With Graphs." arXiv preprint arXiv:1911.03080v1, 2019, pp. 1-6, https://doi.org/10.48550/arXiv.1911.03080 (Year: 2019).*
Kolouri et al, 2019, "Generalized Sliced Wasserstein Distances" (Year: 2019).*
Hastie, T., Tibshirani, R. & Friedman, J. (2009). *The Elements of Statistical Learning: Data Mining, Inference, and Prediction 2nd ed.* Springer. 764 pages.

* cited by examiner

*Primary Examiner* — Abdullah Al Kawsar
*Assistant Examiner* — Jun Kwon
(74) *Attorney, Agent, or Firm* — Mintz, Levin, Cohn, Ferris, Glovsky and Popeo, P.C.; F. Jason Far-hadian, Esq.

(57) ABSTRACT

Computer-implemented machines, systems and methods for providing insights about misalignment in a latent space of a machine learning model. A method includes initializing a second weight matrix of a second artificial neural network based on a first weight matrix from a first artificial neural network. The method further includes applying transfer learning between the first artificial neural network and the second artificial neural network. The method further includes comparing the first latent space with the second latent space. The method further includes determining, responsive to the comparing, a first score indicating alignment of the first latent space and the second latent space. The method further includes determining, and responsive to the first score satisfying a threshold, an appropriateness of the machine learning model.

13 Claims, 8 Drawing Sheets

LATENT-SPACE MISALIGNMENT MEASURE OF RESPONSIBLE AI FOR MACHINE LEARNING MODELS

TECHNICAL FIELD

The disclosed subject matter generally relates to artificial intelligence technology and, more particularly, to technological improvements that identify misaligned data in a latent space for machine learning (ML) models.

BACKGROUND

Artificial intelligence (AI) refers to introducing human-like logic or intuition in a computing system. AI is commonly used to perform tasks that require intelligence or domain expertise which help solve problems that cannot be defined by a predetermined set of rules or fixed logic. AI systems are thus typically deployed to analyze and classify data and make predictions relying on data and dynamic calculations that are far too voluminous and complex for a human to possibly digest and perform, either mentally or by way of pen and paper.

Machine learning (ML) is a subset of AI that utilizes self-learning algorithms to implement intelligent behavior into AI systems and generally refers to the practice of teaching a computing system to learn, including the ability to dynamically adapt and analyze large volumes of data to identify patterns, without requiring explicit programming. Unconventionally, ML models can provide predictive advantages to enhance the functionality of a system or a computing model when complex relationships or constraints are at play.

Disadvantageously, without a good understanding of the influencers, relationships or constraints that define a ML model, the ML model's non-routine functionality and behavior may be prone to errors or undesirable results and biases that may not meet certain principles or standards. For example, a lack of complete understanding of a model's behavior may lead to scenarios involving the encoding of unintentional or unwanted features that inappropriately or unknowingly skew the results generated by the model.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with some implementations of the disclosed subject matter, computer-implemented machines, systems and methods are disclosed for providing insights about misalignment in latent space of a ML model.

In one aspect a method is provided. The method includes initializing a second weight matrix of a second artificial neural network based on a first weight matrix from a first artificial neural network. The method further includes applying transfer learning between the first artificial neural network and the second artificial neural network, the first artificial neural network including first hidden nodes defining a first latent space from the optimized first weight matrix, the second artificial neural network including transfer learned second hidden nodes defining a second latent space and a second transfer learned weight matrix. The method further includes comparing, by the one or more programmable processors, the first latent space with the second latent space to determine a statistical distance measurement between the first latent space and the second latent space. The method further includes determining, by the one or more programmable processors and responsive to the comparing, a first score indicating alignment of the first latent space and the second latent space. The method further includes determining, by the processor and responsive to the first score satisfying a threshold, an appropriateness of the machine learning model.

In some embodiments, a system is provided. The system includes at least one programmable processor. The system further includes a non-transitory machine-readable medium storing instructions that, when executed by the at least one programmable processor, cause the at least one programmable processor to perform operations. The operations include initializing a second weight matrix of a second artificial neural network based on a first weight matrix from a first artificial neural network. The operations further include applying transfer learning between the first artificial neural network and the second artificial neural network, the first artificial neural network including first hidden nodes defining a first latent space, the second artificial neural network including a transferred learned second hidden nodes defining a second latent space. The operations further include comparing the first latent space with the second latent space to determine a statistical distance measurement between the first latent space and the second latent space. The operations further include determining, responsive to the comparing, a first score. The operations further include determining, responsive to the first score satisfying a threshold, an appropriateness of the machine learning model.

In some embodiments, the method may further include initializing, by one or more programmable processors, the first weight matrix of the first artificial neural network. The method may further include optimizing, by the one or more programmable processors, the first weight matrix of the first artificial neural network. The second artificial neural network may be associated with a subset/slice of an aggregate dataset which may be associated with the first artificial neural network. The method may further include optimizing the second weight matrix based on the subset. The optimizing may include applying the equation:

$$W_{slice} \approx -\text{argmin} - J(W; X_{slice}, y_{slice}),$$

where $W_{slice}$ represents the weights of the second artificial neural network, $J(W; X, y)$, represents a loss function, where X includes input features, and y represents a target vector. The second artificial neural network may include a slice artificial neural network and wherein the first artificial neural network may include an aggregate artificial neural network. The subset of the aggregate dataset may include a data slice of the aggregate dataset. Applying transfer learning may yield two distributions for each hidden node, one for the first artificial neural network and one for the second artificial neural network. The comparing may include applying a measure of distance on a distribution of hidden node activation values based on the slice artificial neural network and a distribution of hidden node activation values of the aggregate artificial neural network. Applying the measure of distance may include applying a measure of a Wasserstein distance between two distributions. The applying may include applying the Wasserstein distance between each hidden node of the second artificial neural network and the first artificial neural network. The method may further include multiplying the measure of distance by an absolute value of a corresponding hidden-to-output weight value in the first artificial neural network. Then multiplying the measure of distance by an absolute value of a corresponding hidden-to-output weight value may be given by the equation:

$$\vec{m}_l |w_i|,$$

where i represents the $i^{th}$ hidden node, $\vec{m}_l$ represents the Wasserstein distance between the corresponding aggregate and slice $i^{th}$ hidden node distributions, and $|w_i|$ represents the absolute value of the corresponding hidden-to-output weight value from the first artificial neural network.

In some embodiments, a final measure of latent space misalignment (LMS) is given by taking the largest absolute value of the element-wise vector product, $$LMS = \|\vec{m} * w\|_\infty,$$

where LMS denotes a latent misalignment score and * denotes element-wise vector multiplication. The first score may include the latent misalignment score. The method may further include determining, responsive to the comparing, a second score indicating a measure of misalignment among a plurality of subsets of the aggregate dataset. The method may include applying, responsive to the second score satisfying a threshold, a different machine learning model to a subset of the plurality of subsets. The first score may indicate a measure of latent feature misalignment with respect to the second artificial neural network. The method may further include applying, by the one or more programmable processors and responsive to the determined appropriateness, a different machine learning model to the first artificial neural network and/or the second artificial neural network. The method may further include updating, by the one or more programmable processors and responsive to the determined appropriateness, the machine learning model.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

Where practical, the same or similar reference numbers denote the same or similar or equivalent structures, features, aspects, or elements, in accordance with one or more embodiments.

DETAILED DESCRIPTION

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Decision management systems generally rely upon an underlying set of rules and/or ML models, which deliver one or more decisions that a user can leverage in pursuit of a desired outcome for any given new input. The development of a ML model in general involves considerations of a set of data available for training the model and whether subsets of the available data are appropriate for the decision process. While pooling data from different sources can be a powerful advantage for model training, it can also introduce hidden risks related to the underlying integrity of the model. One of the most impactful choices in a ML model development process is to decide which subsets of data to utilize. Further, it is inevitably important in production to continually re-evaluate the alignment of a specified input data source with the desired decision goal. Measuring the degree of misalignment of a given data source with respect to the underlying ML model both during model development and production is a focus of this application and a core tenant of responsible AI and, more generally, humble AI.

Concepts of the feature space and the latent space are to be distinguished. A group of datasets can be mapped into a collection of features that are inputs for a ML model. This collection of features defines the feature space. The feature space can be defined independently of a ML model, although a ML model will be dependent upon the choice of feature space. The ML model transforms the features into latent variables that are directly used to produce the model output. The latent space of a ML model is defined by the set of latent variables (see FIG. 1), and is inherent to the underlying ML model. Implementations of the current subject matter provide a measure of misalignment for a given subset of data with respect to the ML model by measuring properties of the embedding in latent space.

Existing systems for measuring data alignment have focused primarily on alignment regarding the data used in the development of a ML model and the subsequent embedding of the data in feature space 120. Embodiments described herein may additionally leverage the knowledge in the ML model by analyzing misalignment in the latent space, thereby providing a measure of misalignment with respect to the ML model. Such a concept may be increasingly important in the view of responsible AI and humble AI, where if the data is not aligned with the latent space of the ML model, the ML model should not be used for customer scoring. Measurement systems described herein may provide two levels of misalignment: (i) latent feature misalignment with respect to a given ML model; and (ii) a relative misalignment among subsets of data. Therefore, this measure can be used to not only guide any subsets of data towards a more appropriate model, but also inform modelling choices to ensure sufficient generalization during model development.

Figure 1:
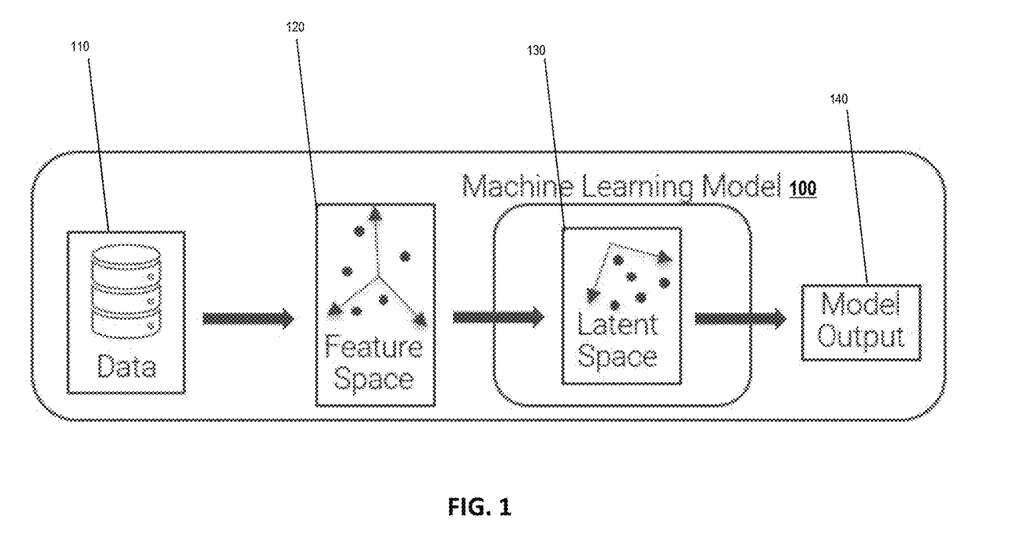
FIG. 1 illustrates components of an example machine learning model, in accordance with one or more implementations.

FIG. 1 illustrates components of an example machine learning (ML) model 100, in accordance with one or more implementations. As shown, the ML model 100 includes a dataset 110, a feature space 120, a latent space 130, and a model output 140. The ML model 100 may be implemented on a computing system, the computing system may be a general-purpose computer, for example, or any other suitable computing or processing platform. The computing system may include learning software (e.g., a machine learning or self-learning software) that receives input dataset 110.

In accordance with one or more embodiments, learning software may process the dataset 110 associated with certain features (e.g., individual measurable properties or characteristics of a phenomenon or the dataset 110 being observed). The features may define the feature space 120. As shown the feature space 120 may be processed to produce the latent space 130. The latent space 130 may be a compressed representation of the feature space. Latent space 130 may be useful for learning data features and for finding simpler representations of data (e.g., dataset 110) for analysis.

The ML model 100 may transform latent variables in the latent space 130 to the model output 140. In some aspects, the generated model output 140 may indicate that the data 110 is classified as belonging to a certain class by the learning software. In one aspect, the model output 140 may be checked against an associated label to determine how accurately the learning software (e.g., a machine learning or self-learning software) is classifying the dataset 110.

The embodiments described herein include measuring the alignment (or conversely, misalignment) of a subset of data (e.g., subset of the dataset 110) with respect to an existing ML model (e.g., ML model 100). A computerized implementation can be used to create an end-to-end software solution to obtain misalignment scores. The implementation may involve additional tuning of the ML model with an emphasis on the selected subset of data, which may result in a new ML model that is of the same class of model as the original ML model. Using various techniques to compare the two ML models provides a measure of change between these two ML models. Such a measure of change can then be referred back to the subset of data to indicate the degree of misalignment of the subset of data with respect to the original predictive model. In what follows, we will make these notions more specific.

Aggregate data may be defined as a finite collection of subsets of data that all belong to the same feature space and target space (e.g., dataset 110), in the context of a supervised ML model. For example, each subset of data may correspond to data from a different client financial institution or alternatively, to a sub-portfolio of data within one financial institution or more generally a proper subset of data from the aggregate data. Without loss of generality, a subset of data may be referred to as a data slice, a ML model trained on aggregate data may be referred to as an aggregate ML model, and a ML model trained on a data slice may be referred to as a slice ML model. In some aspects, the combined data from each data slice may result in the aggregate data (see FIG. 2), but the data slice need not have a non-empty intersection with the aggregate data.

Figure 2:
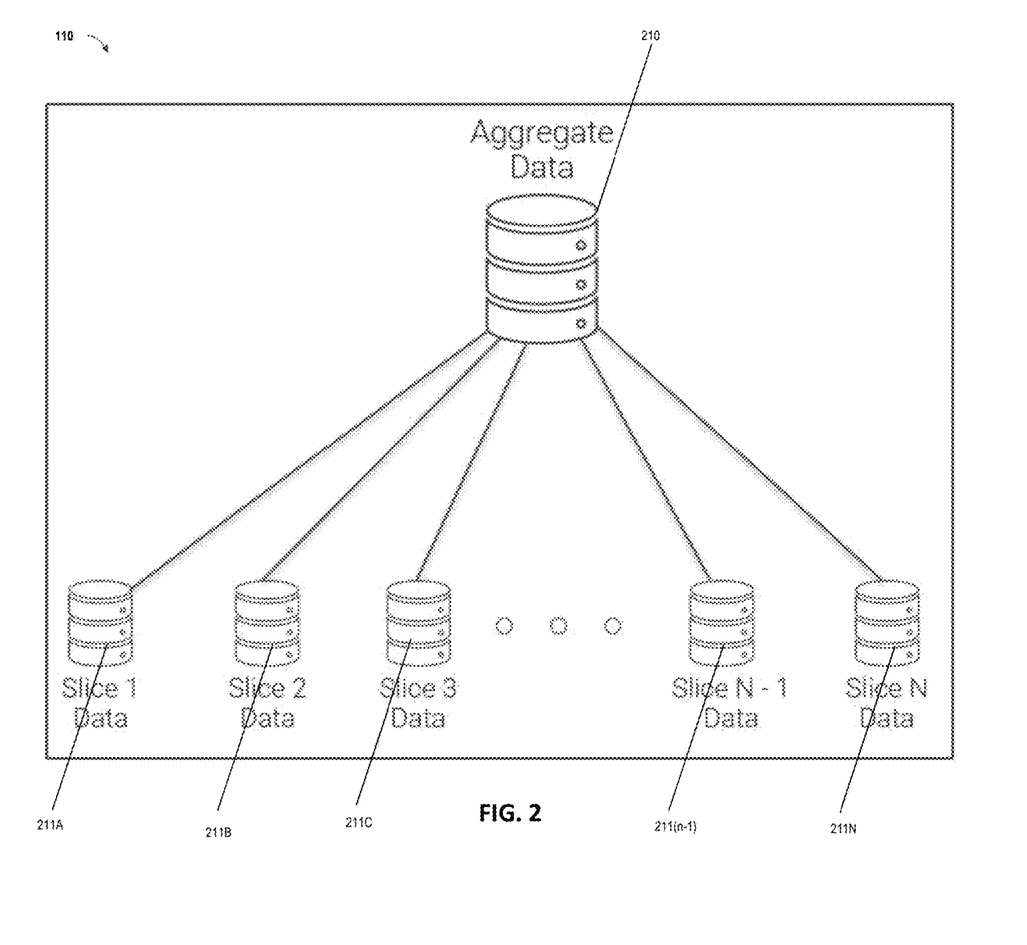
FIG. 2 is a diagram of an example aggregate data set and sliced data sets, in accordance with one or more implementations.

FIG. 2 is a diagram of an example dataset 110 including an aggregate dataset 210 and sliced datasets 211, in accordance with one or more implementations. As noted herein, the aggregate dataset 210 may be divided up among one or more subsets (e.g., slices 211). As shown in the example of FIG. 2, the aggregate dataset 210 includes an N quantity of data slices (e.g., 211A-211N), although other quantities of slices are also possible.

Aggregate dataset 210 may provide a larger pool of data upon which a predictive ML model (e.g., ML model 100) can be trained. Aggregate data (e.g., aggregate dataset 210) may often lead to more robust ML models, particularly when the data slices (e.g., slices 211) in the aggregate data have similar representations in the feature space, and subsequently the data from one slice can benefit another. Various techniques for measuring similarity/dissimilarity between slices in the feature space, include K-Means clustering, K-Nearest Neighbors, Hierarchicalclustering, and auto encoder misalignment measures. A slice's feature space embedding may not be dependent upon the underlying predictive ML model, and many predictive ML models, such as artificial neural networks, explicitly embed the feature vectors into a latent variable space (e.g., referred to as the "latent space"). Implementations described herein focus upon the case of artificial neural networks, which generally perform a non-linear, non-isometric transformation from the feature space to the latent space. This has the consequence that similarity/dissimilarity in feature space does not always imply similarity/dissimilarity in latent space.

In example embodiments, the ML model may be deployed to analyze data or features associated with an applicant's profile, where the applicant is attempting to apply for obtaining credit or a loan. Based on the analysis of such features, the ML model may approve an applicant, may deny credit of an applicant, and/or may assign a risk score to the applicant. In some example implementations, financial transactions are described herein for the purpose of illustration and are intended to help provide an enabling disclosure. These examples should not be construed as limiting the scope of this disclosure to particular scenarios or implementations.

Example implementations described herein may deviate from feature-space-based measures in that the example implementations focus on latent space misalignment. There may be an underlying motivation for the focus on latent space misalignment. As noted earlier, the latent variables are directly used to determine the output 140 of the ML model 100. While the input feature variables contribute to the model output, it is the latent space (e.g., latent space 130), into which the features are projected, that determines the output when combined with the ML model. In other words, the knowledge of the feature vectors alone, is insufficient to gain knowledge of the final output (e.g., output 140). The knowledge of the ML model's latent space (e.g., latent space 130) embedding must be understood to ensure that one is building models associated with responsible AI concepts. Therefore, obtaining a measure of a slice's misalignment in latent space, may provide direct information on the suitability (or lack thereof) between the slice data and the aggregate model, which may be essential for responsible AI and results in decisions in humble AI around abandonment of the model for another decision process or model that is more appropriate.

Furthermore, model explainability may be sensitive to those changes in the latent space, and misalignment can result in non-ethical use of a model on a segment of customers and/or erroneous decision explanations. An analysis that focuses only on the feature space can at best hope for a correlation sense of model explainability, and may miss subtle perturbations in feature space that result in larger shifts in latent space. Note the later occurrence is of particular concern in the area of adversarial examples. This measure may be performed during model development, but importantly it can also be continually evaluated in production to validate the on-going integrity of the model and data in the pursuit of Responsible AI.

As an exemplary implementation, we consider a binary classifier known as a feed-forward artificial neural network (ANN). An ANN may define a function from feature space to the real numbers that is represented by a weighted directed acyclic graph where each vertex (hereafter referred to as a "node") is associated with a real value, known as a "bias", and an "activation" function. A key aspect of ANNs is their structure as a composition of layers. A layer is composed of individual nodes where weighted edges (hereafter referred to as "weights") connect nodes in different layers. The input feature vector forms the input layer, and the output layer consists of a single node that corresponds to the estimated probability of belonging to a particular class. All other intermediate layers are known as hidden layers, whose node values form the latent space (see FIG. 3).

Figure 3:
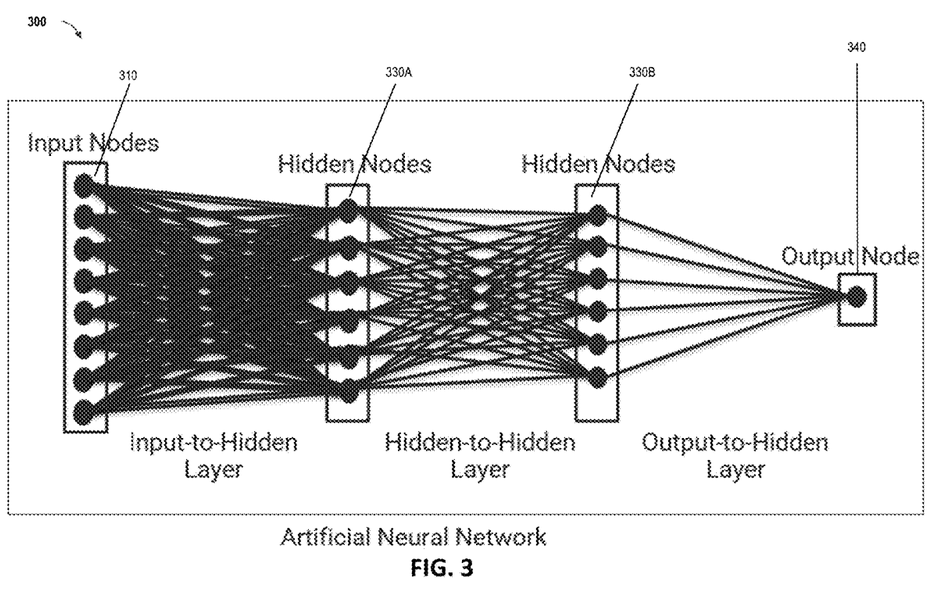
FIG. 3 is a diagram of an example artificial neural network, in accordance with one or more implementations.

FIG. 3 is a diagram of an example artificial neural network 300, in accordance with one or more implementations. As shown, the artificial neural network 300 includes an input node layer 310, a hidden node layer 330A, a hidden node layer 330B, and an output node layer 340. As further shown, the input node layer 310 may be transformed to a first hidden node layer 330A; the first hidden node layer 330 may be transformed to a second hidden node layer 330B; and the second hidden node layer 330B may be transformed to generate the output node layer 340.

An affine transformation consisting of a weighted linear combination of the node outputs in the prior layer plus a bias vector is input into the activation function of the nodes in the next layer. More formally, an L-layer ANN may be a function, $f(x; W_1, W_2, \ldots, W_L, b_1, b_2, \ldots, b_L)$, parameterized by the corresponding weights, $W_i$, biases, $b_i$, and piecewise-differentiable activation functions, $\sigma_i$, for each layer i. Note that the choice of activation functions is a hyper-parameter as opposed to a parameter. The output of the ANN 300 may be defined by the following relations, $$f(x; W_1, W_2, \ldots, W_L, b_1, b_2, \ldots, b_L) = \sigma_L,$$

$$\sigma_i := (W_i \sigma_{i-1} + b_i) \text{ for } i \in [1, 2, \ldots, L],$$

$$\sigma_0 := X.$$

Without loss of generality, the term "weights" may include both the weights and the bias values (e.g., in a matrix), then the ANN 300 may be represented by $f(x; W)$. Given a set of data, $(X, y)$, where X contains the input features and y is the target vector, and a loss function, $J(W; X, y)$, the weights, W, are learned by finding a value that approximately minimizes the loss function, $$W^* \cong \operatorname{argmin} J(W; X, y).$$

Commonly, the weights are learned by minimizing the loss function via back propagation. The weights for the aggregate ANN may be defined as, $$W_{aggregate} \cong \operatorname{argmin} J(W; X_{aggregate}, y_{aggregate}),$$

and the corresponding aggregate ANN may be $f(x; W_{aggregate})$.

Figure 4:
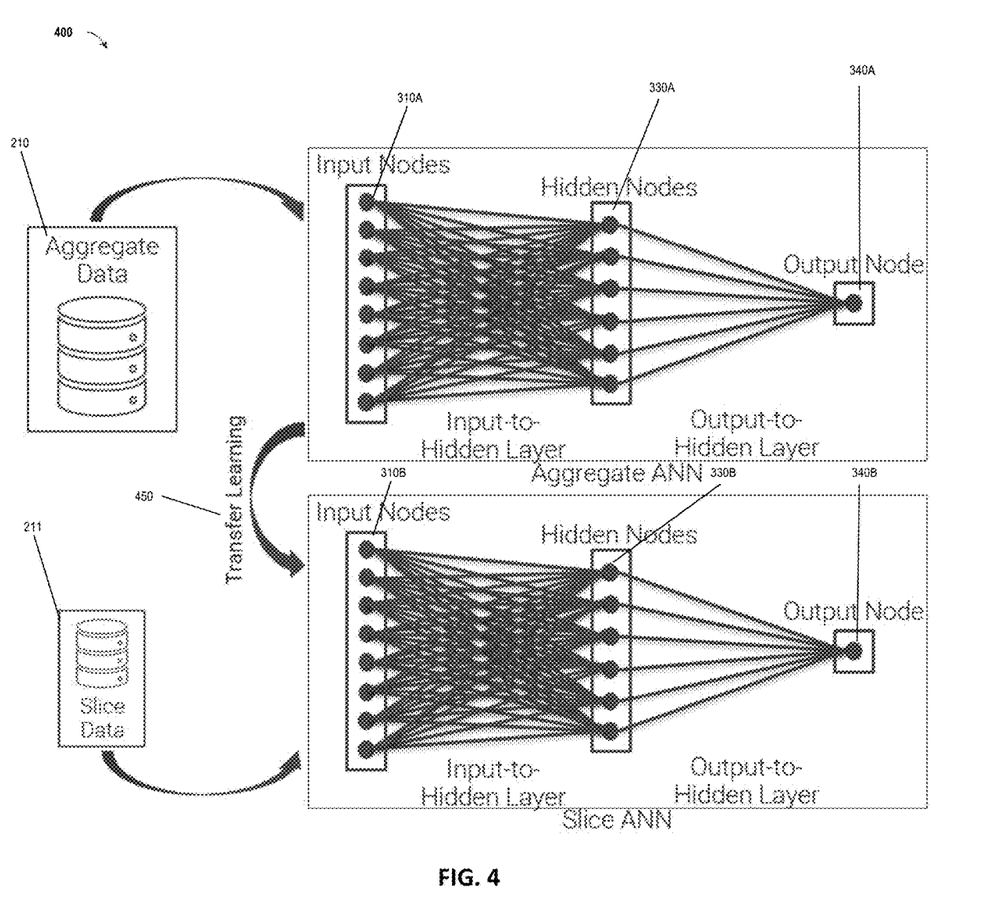
FIG. 4 is a diagram of transfer learning between an aggregate neural network and a slice neural network, in accordance with one or more implementations.

In some aspects, an ANN may include a single hidden layer (e.g., see FIG. 4). The associated latent space may be composed of the values of the nodes from the hidden layer, and the mapping from the input feature vector to the hidden layer values is a transformation from the feature space to the latent space. Embodiments described herein provide a measure of misalignment between a data slice and the aggregate model latent space.

FIG. 4 is a diagram 400 of transfer learning between an aggregate artificial neural network (ANN) and a slice ANN, in accordance with one or more implementations. As shown in the top portion of the example of FIG. 4, the aggregate ANN includes an input node layer 310, a hidden node layer 330 and an output node layer 340. The bottom portion of the example of FIG. 4 depicts the slice ANN similarly including an input node layer 310, a single hidden node layer 330, and an output node layer 340. As further shown, the slice ANN includes a slice dataset 211 and the aggregate ANN includes the aggregate dataset 210

The first step in determining misalignment between a data slice and the aggregate model latent space utilizes the technique of transfer learning 450, which is applied using the aggregate model weights and the data slice. Transfer learning is a research topic in ML that focuses on storing knowledge gained while solving one problem and applying it to a different but related problem. The transfer learning example described herein (e.g., transfer learning 450) proceeds by first initializing the weights of the slice ANN with the weights from the aggregate ANN, then optimizing:

$$W_{slice} \cong \operatorname{argmin} J(W; X_{slice}, y_{slice}).$$

The resulting slice ANN is given by $f(x; W_{slice})$. This provides a meaningful connection between the aggregate latent space and the slice latent space, whereas simply initializing the slice ANN with random weights would have no such connection. After applying transfer learning, the ML model may generate two sets of hidden nodes, one from the aggregate ANN and the other from the slice ANN (e.g., hidden node layer 330A and hidden node layer 330B of FIG. 4).

The aggregate latent space and the slice latent space may now be compared by applying a measure of distance on the distribution of hidden node activation values based on the data slice. Many statistical distance measures can be used here such as the Wasserstein distance or the Kolmogorov-Smirnov distance. Without loss of generality, the examples described herein use the Wasserstein distance, which provides a measure of distance between probability distributions. Besides having many pleasing theoretical properties, the Wasserstein distance offers an intuitive explanation of distance. By viewing the probability distributions as mounds of dirt, the Wasserstein distance may be understood as the minimum amount of work required to transform one probability distribution into the other, thus it is also referred to as the Earth Mover's distance.

An immediate consequence is that the Wasserstein distance does not saturate in value, unlike the Kolmogorov-Smirnov distance, thereby providing greater resolution in case of larger distances. Additionally, the distance does not restrict itself by leveraging only a particular moment or extremal statistic of the distributions, but instead it is able to integrate many different properties such as mode and kurtosis for a more complete notion of distance. Applying the Wasserstein distance to each hidden node provides a measure of misalignment between the corresponding aggregate and slice hidden node(s). Since there can be many hidden nodes in a single hidden layer, this provides a vector of values, $$\vec{m}_i = m(P_i, Q_i),$$

where i represents the $i^{th}$ hidden node, m is the Wasserstein distance, $P_i$ is the distribution of the $i^{th}$ hidden node activation values from the consortium ANN f(x; $W_{consortium}$), and $Q_i$ is the distribution of the $i^{th}$ hidden node activation values from the slice ANN f(x; $W_{client}$). Next, each Wasserstein hidden node distance is multiplied by the absolute value of its corresponding hidden-to-output weight value in the aggregate ANN, $w_i$:

$$\vec{m}_i \cdot |w_i|$$

Figure 5:
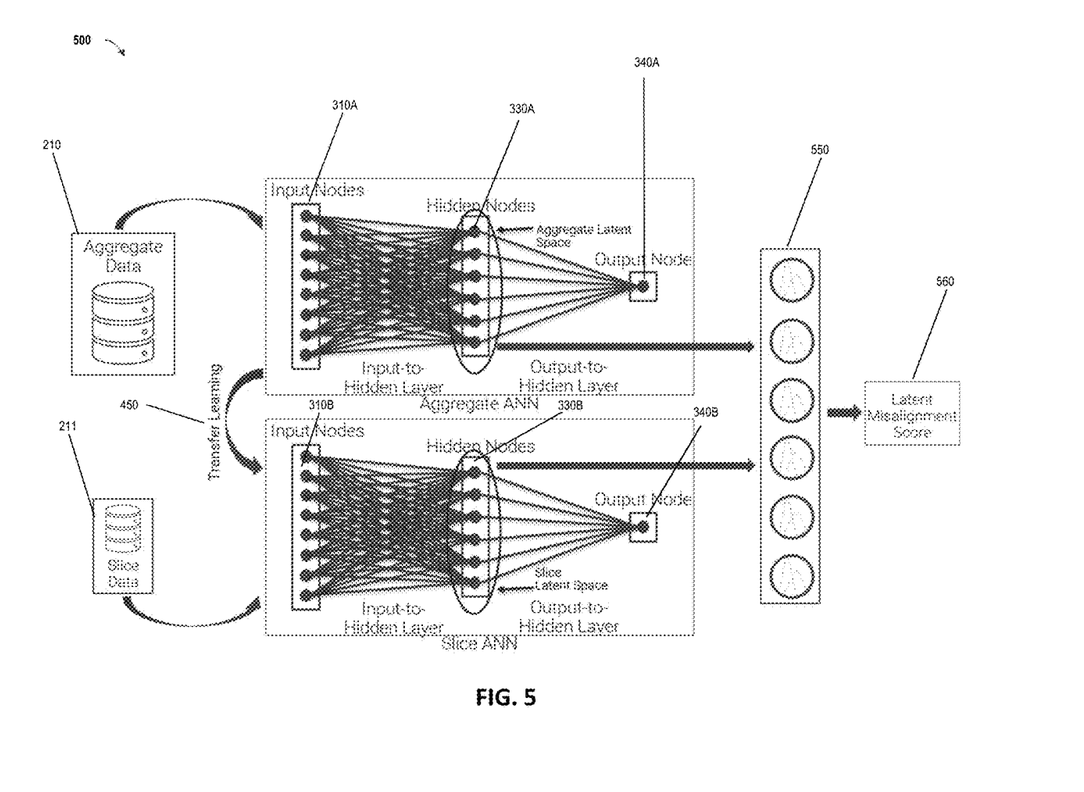
FIG. 5 is a diagram of the aggregate neural network and the slice neural network calculating and generating a latent misalignment score, in accordance with one or more implementations.

The effect here is to weight each hidden node by a notion of importance with respect to the aggregate ANN. Some hidden nodes will invariably contain low information value and any subsequent large changes in distribution will not be as informative in terms of misalignment. A ML model with reasonable regularization would assign small weights to such low information nodes, thereby reducing their influence on the final measure. Finally, to have a single value of latent space misalignment, the $\ell_\infty$-norm is applied, $$LMS = \|\vec{m} * w\|_\infty,$$

where LMS denotes the Latent Misalignment Score (see FIG. 5) and * denotes element-wise vector multiplication.

FIG. 5 is a diagram 500 of the aggregate ANN and the slice ANN calculating and generating a latent misalignment score, in accordance with one or more implementations. As shown, the latent space of the aggregate ANN (e.g., hidden node layer 330A) and the latent space of the slice ANN (e.g., hidden node layer 330B) may be combined and/or compared at hidden node latent space 550. As further shown, a latent misalignment score (LMS) 560 may be calculated and generated as described above.

In some aspects, the range of values of a LMS can vary greatly depending upon the underlying aggregate model and the degree of homogeneity or heterogeneity among the slices of data composing the aggregate data. Consider the following three instantiations of aggregate and slice data.
1. Each slice is a separate client financial institution, and the aggregate is a consortium of client data.
2. Each slice is a sub-portfolio of data within a single client financial institution, and the aggregate is the client's entire portfolio of data.
3. The aggregate is a single dataset and each slice is given by a random or semi-random split of the data.

In the first and second case, the level of diversity among the clients or among the sub-portfolios of a single client can lead to greater inhomogeneity in the aggregate data. Conversely, in the last case, a random splitting on a sufficiently sized dataset would be expected to confer a larger degree of homogeneity among the slices in the aggregate data. Given the level of homogeneity would be quite different in the cases outlined above, it may be desirable to have a measure of misalignment for each slice that is relative to the measure of misalignment among the other slices. Then the following steps can be taken to provide a relative measure of aggregate misalignment. Denoting the sample mean across slice LMS values by $\bar{x}$ and the sample standard deviation by s, the following standardized LMS value can be calculated for the $j^{th}$ slice, $$\overline{LMS}_j = \frac{\max(LMS_j - \bar{x}, 0)}{s}.$$

An aggregate misalignment score for a given slice may provide one measure of aggregate model suitability for that slice, and this misalignment score has implications for responsible AI and the appropriateness of the aggregate ML model (or underlying decision process) for the given slice. A high LMS (e.g., satisfying a threshold) may indicate that a different model or even decision process may need to be considered to deliver more optimal performance or more importantly to ensure responsible use of AI, and moreover with the misaligned data slice removed the other data slices may benefit from the revised aggregate data and resulting machine learning model development.

As a demonstration of the misalignment scoring described herein, we consider the first of the 3 cases outlined above. In an illustrative example, a consortium model is used for credit card fraud detection and developed from a collection of financial institutions in the United Kingdom and Ireland (UK/I). For each client in the consortium data, a client ANN is developed by initializing the ANN with the consortium ANN weights, then optimizing the weights via the client's data and back-propagation. With a client ANN in hand, the values of the hidden nodes for both the client ANN and the consortium ANN are calculated by forward propagating the non-fraud feature vectors through each respective ANN. Note the fraud feature vectors are excluded in this evaluation, as the stable and persistent population of interest is the client's collection of non-fraud payment card transactions. However, there could be some scenarios in which the fraud data may be used as well. The set of values for each hidden node generates a 1-dimensional empirical distribution for each hidden node from the respective ANN. Multi-nodal and multi-dimensional empirical distributions may be considered, as well as other combinations of the node empirical distributions, but the use of transfer learning generally enables straight-forward 1-dimensional node distribution analysis to be sufficiently informative.

Transfer learning may increase the likelihood that the stochastic dynamics of the learned weights remain near a particular basin of attraction, although both the severity of misalignment (e.g., a LMS value) and the size of the slice (e.g., slice 211) may contribute to the resulting shift in weight space and latent space. This may yield two empirical distributions for each hidden node, one for the client/slice model and one for the consortium/aggregate model. Applying the Wasserstein distance to each pair of empirical distributions, yields a Wasserstein distance for each hidden node, which is then multiplied by the corresponding hidden-to-output weight of the consortium ANN. The resulting vector is then reduced to a single value by application of the $\ell_\infty$-norm. This results in a single LMS value for each slice in the aggregate model. To obtain a standardized sense of aggregate misalignment, the sample mean and standard deviation across slice LMS values is calculated, and the number of standard deviations above the mean is produced for each slice.

Now we have the Wasserstein distance between the distributions of the $i^{th}$ hidden node of the consortium ANN $P_i$ and the $j^{th}$ client ANN $Q_i^j$, $$\vec{m}_{i,j} = m(P_i, Q_i^j),$$

where m denotes the Wasserstein distance. Applying element-wise multiplication to the absolute values of the hidden-to-output weights with a matrix of node Wasserstein distance values, then applying the $\ell_\infty$-norm to each column yields a single LMS value for each client.

Figure 6:
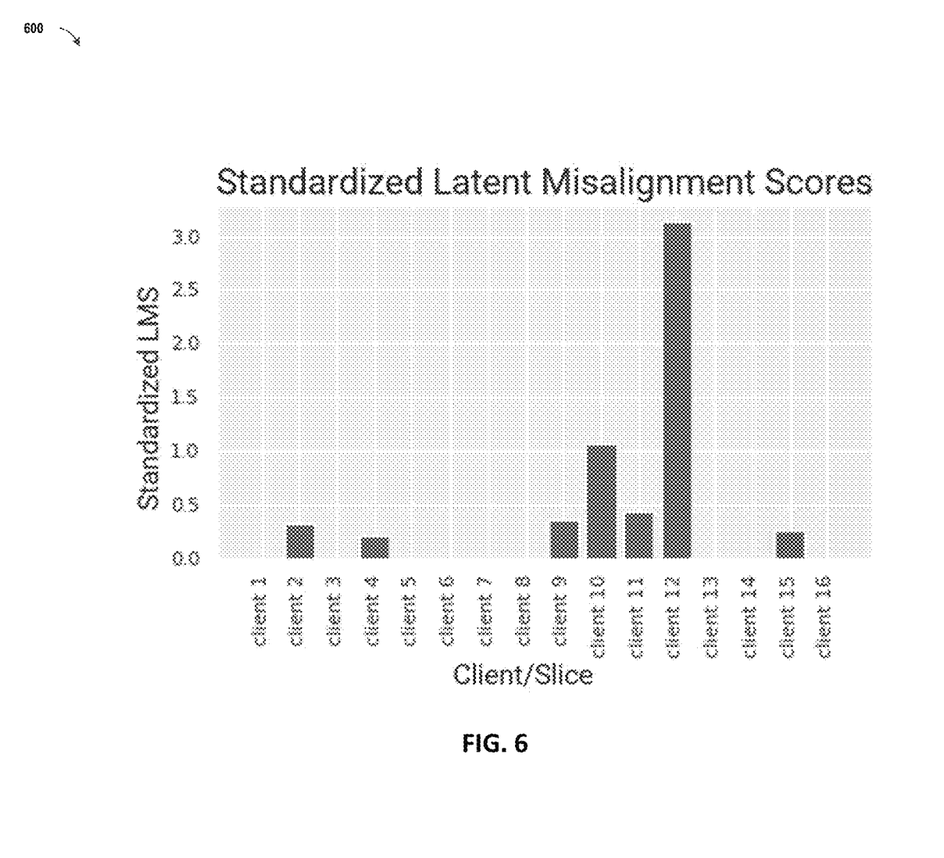
FIG. 6 is a graph diagram illustrating misalignment scores for different slices of data, in accordance with one or more implementations.

FIG. 6 is a graph diagram 600 illustrating misalignment scores for different slices of data, in accordance with one or more implementations.

As shown, the values indicate that one client (e.g., client 12) has the highest measure of latent-space misalignment with the consortium ANN. To get a better sense of just how misaligned this one client is with respect to the other clients in the consortium we can standardize the LMS values. This may be done by calculating the sample mean and standard deviation of LMS values across all clients in the consortium, then transforming the LMS value as follows, $$\overline{LMS}_j = \frac{\max(LMS_j - x, 0)}{s}.$$

Note other non-parametric or robust measures of typicality and spread may be used here, but for many applications the empirical first moment and centered second moment will suffice to control for the variety of observed LMS scores. As shown in FIG. 6, client 12 is the most misaligned client with respect to the consortium ANN, while another client (client 10) shows some misalignment as well, although it is considerably less than client 12. Thresholding at more than one standard deviation above the mean, indicates that client 10 and client 12 both warrant further examination or action in order to adhere with responsible AI.

Examining the data for client 12 in the example of FIG. 6 may reveal a sub-portfolio of payment cards that differ from the more common payment card sub-types that compose the majority of the data used in the UK/I consortium model. While client 10 may have many sub-portfolios of payment card sub-types that are common in the consortium data, it also has a couple of different payment card subtypes that aren't as well aligned. As a result, the LMS values for these clients have picked up on deviations in the latent space that can be used to guide these slices towards more appropriate models consistent with Responsible AI. A misalignment in the aggregate latent space may imply sub-optimal decisions and/or erroneous decision explanations that can be remedied with better model alignment (e.g., applying a different ML model to a dataset or data slice). The upshot is potentially better explainability and additional guidance towards humble AI. Furthermore, LMS values should be regularly monitored once the decision process is in production to ensure the continued viability of the decision management system in accordance with Responsible AI.

A measure (e.g., latent misalignment score 560) to programmatically identify misaligned slices of data (e.g., slices 211) in the aggregate latent space of ML models has been described. The LMS measure has been validated to quantitatively determine how well-aligned/misaligned a given sub-population of data is with respect to a ML model.

Figure 7:
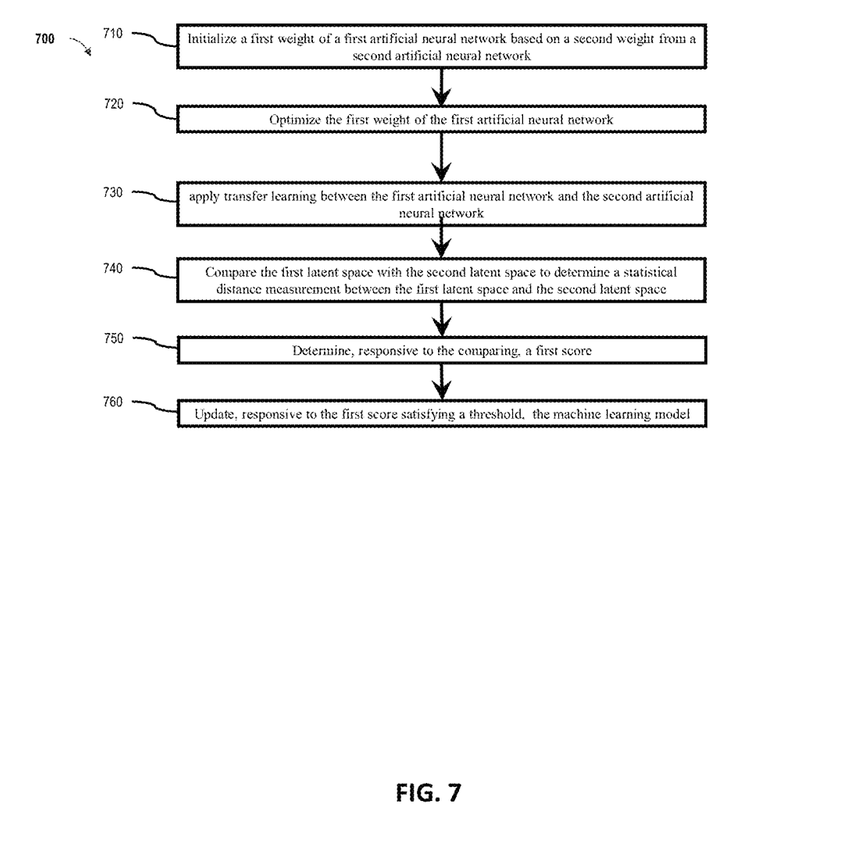
FIG. 7 is a flowchart of an example process for identifying misalignment in a latent space of a machine learning model.

FIG. 7 is a flowchart of an example process 700 for identifying misalignment in a latent space of a ML model. The process 700 may be implemented as part of a computing system such as a decision software. Referring to FIGS. 1-8, the process 700 may be implemented as part of a computing system such as a decision software, the computing apparatus 800, and/or the like.

At operational block 710, the apparatus 800, for example, may initialize a first weight matrix of a first artificial neural network based on a second weight matrix from a second artificial neural network. For example, one or more weights of a slice ANN (e.g., a first weight) may be initialized with one or more weights from the aggregate ANN (e.g., a second weight).

At operational block 720, the apparatus 800, for example, may optimize the first weight matrix of the first artificial neural network. For example, the apparatus 800 may optimize the weight matrix via the aggregate and/or slice data and back-propagation. In some aspects, operational blocks 710 and 720 may be optional. For example, an existing artificial neural network model may be running at a client side apparatus and may not need the initialized weights that are later optimized. Rather, the weights of the existing artificial neural network model may be transferred to the second artificial neural network, as described in block 730.

At operational block 730, the apparatus 800, for example, may apply transfer learning between the first artificial neural network and the second artificial neural network. The first artificial neural network may include first hidden nodes defining a first latent space. The second artificial neural network may include transfer learned second hidden nodes defining a second latent space and a second transfer learned weight matrix. For example, transfer learning may yield two empirical distributions for each hidden node, one for the client/slice model and one for the consortium/aggregate model.

At operational block 740, the apparatus 800, for example, may compare the first latent space with the second latent space to determine a statistical distance measurement between the first latent space and the second latent space. For example, the aggregate latent space and the slice latent space may be compared by applying a measure of distance (e.g., a Wasserstein distance) on the distribution of hidden node activation values based on the data slice.

At operational block 750, the apparatus 800, for example, may determine, responsive to the comparing, a first score. For example, the first score may include a latent misalignment score determined by at least multiplying the measurement of distance (e.g., the Wasserstein distance) by an absolute value of its corresponding hidden-to-output weight value in the aggregate ANN.

At operational block 760, the apparatus 800, for example, may update, responsive to the first score satisfying a threshold, the machine learning model. For example, if the first score (e.g., LMS score) satisfies a threshold, the apparatus 800 may determine that misalignment is too high and that a different ML model or decision process may need to be considered (e.g., applied) to deliver more optimal performance or more importantly to ensure responsible use of AI, and moreover with the misaligned data slice removed the other data slices may benefit from the revised aggregate data and resulting ML model development.

Figure 8:
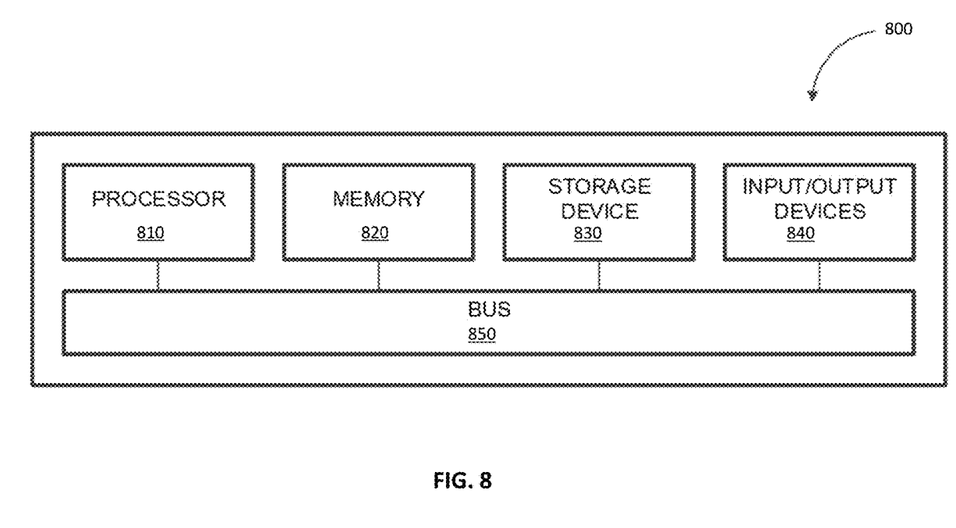
FIG. 8 depicts a block diagram illustrating a computing apparatus consistent with implementations of the current subject matter.

Referring to FIG. 8, a block diagram illustrating a computing system 800 consistent with one or more embodiments is provided. The computing system 800 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 8, the computing system 800 can include a processor 810, a memory 820, a storage device 830, and input/output devices 840. The processor 810, the memory 820, the storage device 830, and the input/output devices 840 can be interconnected via a system bus 850. The processor 810 is capable of processing instructions for execution within the computing system 800. Such executed instructions can implement one or more components of, for example, a cloud platform. In some implementations of the current subject matter, the processor 810 can be a single-threaded processor. Alternately, the processor 810 can be a multi-threaded processor. The processor 810 is capable of processing instructions stored in the memory 820 and/or on the storage device 830 to display graphical information for a user interface provided via the input/output device 840.

The memory 820 is a computer readable medium such as volatile or non-volatile that stores information within the computing system 800. The memory 820 can store data structures representing configuration object databases, for example. The storage device 830 is capable of providing persistent storage for the computing system 800. The storage device 830 can be a floppy disk device, a hard disk device, an optical disk device, or a tape device, or other suitable persistent storage means. The input/output device 840 provides input/output operations for the computing system 800. In some implementations of the current subject matter, the input/output device 840 includes a keyboard and/or pointing device. In various implementations, the input/output device 840 includes a display unit for displaying graphical user interfaces.

According to some implementations of the current subject matter, the input/output device 840 can provide input/output operations for a network device. For example, the input/output device 840 can include Ethernet ports or other networking ports to communicate with one or more wired and/or wireless networks (e.g., a local area network (LAN), a wide area network (WAN), the Internet).

In some implementations of the current subject matter, the computing system 800 can be used to execute various interactive computer software applications that can be used for organization, analysis and/or storage of data in various (e.g., tabular) format (e.g., Microsoft Excel®, and/or any other type of software). Alternatively, the computing system 800 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 840. The user interface can be generated and presented to a user by the computing system 800 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

A portion of the disclosure of this patent document may contain material, which is subject to copyright protection. The owner has no objection to facsimile reproduction by any one of the patent document or the patent disclosure, as it appears in the Patent and Trademark Office patent file or records, but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

What is claimed is:

1. A computer-implemented method for providing improved insights about misalignment in latent space of a machine learning model, a first artificial neural network comprising a first weight matrix and an aggregate artificial neural network associated with an aggregate data set, a second artificial neural network comprising a second weight matrix and a slice artificial neural network associated with a subset of the aggregate dataset, the method comprising:
    initializing, by one or more programmable processors, the second weight matrix of the second artificial neural network based on the first weight matrix of the first artificial neural network using a first training set, the second weight matrix optimized via back-propagation based on training the second artificial neural network based on the subset of the aggregate dataset comprising a data slice of the aggregated data set;
    applying, by the one or more programmable processors, transfer learning between the first artificial neural network and the second artificial neural network, the first artificial neural network including first hidden nodes defining a first latent space from the first weight matrix, the second artificial neural network including transfer learned second hidden nodes defining a second latent space based on the second weight matrix;
    comparing, by the one or more programmable processors, the first latent space with the second latent space to determine a statistical distance measurement between the first latent space and the second latent space, the comparing comprising applying a normalization formula to determine a distance measure for latent space misalignment, the distance measure indicating a measure of distance between the first latent space and the second latent space determined by a statistical measure distance between at least one hidden node of the second artificial neural network and at least one hidden node of the aggregate artificial neural network based on a distribution of hidden node activation values on data slice hidden node activation values of the aggregate artificial neural network;
    determining, by the one or more programmable processors and responsive to the comparing, a first score indicating alignment of the first latent space and the second latent space; and
    determining, by the one or more programmable processors and responsive to the first score satisfying a threshold, whether there is a latent space misalignment between the first latent space and the second latent space by multiplying the distance measure by an absolute value of a corresponding hidden-to-output weight value in the aggregate artificial neural network.

2. The method of claim 1, further comprising: initializing, by the one or more programmable processors, the first weight matrix of the first artificial neural network; optimizing, by the one or more programmable processors, the first weight matrix of the first artificial neural network via back-propagation.

3. The method of claim 1, wherein the statistical measure distance is determined based on application of a Wasserstein distance or a Kolmogorov-Smirnov distance.

4. The method of claim 3, wherein the multiplying the measure of distance by an absolute value of a corresponding hidden-to-output weight value is given by an equation:

$$\vec{m}_I \cdot |w_i|,$$

where i represents an $i^{th}$ hidden node, $\vec{m}_I$ represents the Wasserstein distance between the corresponding aggregate dataset and the distribution of hidden node activation values on data slice hidden node activation values, and $|w_i|$ represents the absolute value of the corresponding hidden-to-output weight value.

5. The method of claim 4, further comprising applying, responsive to the multiplying, the normalization formula.

6. The method of claim 5, wherein the normalization formula comprises:

$$LMS = \|\vec{m} * w\|_\infty$$

where LMS denotes a latent misalignment score and * denotes element-wise vector multiplication.

7. The method of claim 6, wherein the first score comprises the latent misalignment score.

8. The method of claim 1, further comprising determining, responsive to the comparing, a second score, the second score indicating a measure of misalignment among a plurality of subsets of the aggregate dataset.

9. The method of claim 8, further comprising applying, responsive to the second score satisfying a threshold, a different machine learning model to a subset of the plurality of subsets.

10. The method of claim 1, further comprising:
updating, by the one or more programmable processors and responsive to the distance measure for latent space misalignment, the machine learning model.

11. The method of claim 1 further comprising:
applying, by the one or more programmable processors and responsive to the distance measure for latent space misalignment, a different machine learning model to the first artificial neural network and/or the second artificial neural network.

12. The method of claim 1, wherein the first score indicates a measure of latent feature misalignment with respect to the second artificial neural network.

13. A system for providing improved insights about misalignment in latent space of a machine learning model, a first artificial neural network comprising a first weight matrix and an aggregate artificial neural network associated with an aggregate data set, a second artificial neural network comprising a second weight matrix and a slice artificial neural network associated with a subset of the aggregate dataset, the method comprising:
  initializing, by one or more programmable processors, the second weight matrix of the second artificial neural network based on the first weight matrix of the first artificial neural network using a first training set, the second weight matrix optimized via back-propagation based on training the second artificial neural network based on the subset of the aggregate dataset comprising a data slice of the aggregated data set;
  applying, by the one or more programmable processors, transfer learning between the first artificial neural network and the second artificial neural network, the first artificial neural network including first hidden nodes defining a first latent space from the first weight matrix, the second artificial neural network including transfer learned second hidden nodes defining a second latent space based on the second weight matrix;
  comparing, by the one or more programmable processors, the first latent space with the second latent space to determine a statistical distance measurement between the first latent space and the second latent space, the comparing comprising applying a normalization formula to determine a distance measure for latent space misalignment, the distance measure indicating a measure of distance between the first latent space and the second latent space determined by a statistical measure distance between at least one hidden node of the second artificial neural network and at least one hidden node of the aggregate artificial neural network based on a distribution of hidden node activation values on data slice hidden node activation values of the aggregate artificial neural network;
  determining, by the one or more programmable processors and responsive to the comparing, a first score indicating alignment of the first latent space and the second latent space; and
  determining, by the one or more programmable processors and responsive to the first score satisfying a threshold, whether there is a latent space misalignment between the first latent space and the second latent space by multiplying the distance measure by an absolute value of a corresponding hidden-to-output weight value in the aggregate artificial neural network.

* * * * *